United States Patent [19]
Tsuria et al.

[11] Patent Number: 5,939,975
[45] Date of Patent: Aug. 17, 1999

[54] THEFT PREVENTION SYSTEM AND METHOD

[75] Inventors: Yossef Tsuria, Shoham; Doron Handelman, Givatayim, both of Israel

[73] Assignee: NDS Ltd., United Kingdom

[21] Appl. No.: 08/897,013

[22] Filed: Jul. 18, 1997

[30] Foreign Application Priority Data

Sep. 19, 1996 [IL] Israel ......................................... 199284

[51] Int. Cl.[6] .................................................. B60R 25/10
[52] U.S. Cl. ................... 340/426; 340/539; 340/825.31; 340/825.72; 207/10.5; 207/10.6
[58] Field of Search ................................ 340/425.5, 426, 340/825.31, 825.49, 825.69, 825.72, 539; 307/10.2, 10.5, 10.6

[56] References Cited

U.S. PATENT DOCUMENTS

| | | | |
|---|---|---|---|
| 4,918,425 | 4/1990 | Greenberg et al. | 340/539 |
| 4,987,406 | 1/1991 | Reid | 340/539 |
| 5,223,844 | 6/1993 | Mansell et al. | 342/357 |
| 5,349,329 | 9/1994 | Smith | 340/539 |
| 5,459,448 | 10/1995 | Dortenzio et al. | 340/426 |
| 5,561,420 | 10/1996 | Kleeefeldt et al. | 340/825.31 |
| 5,652,564 | 7/1997 | Winbush | 340/426 |
| 5,774,060 | 6/1998 | Ostermann et al. | 340/825.31 |
| 5,805,056 | 9/1998 | Mueller et al. | 340/426 |
| 5,838,227 | 11/1998 | Murray | 340/426 |

FOREIGN PATENT DOCUMENTS

| | | | |
|---|---|---|---|
| 1007815 | 10/1995 | Belgium . | |
| 0 319428 | 7/1989 | European Pat. Off. | B60R 25/04 |
| 0 712768 | 5/1996 | European Pat. Off. | B60R 25/04 |
| 0 715998 | 6/1996 | European Pat. Off. | B60R 25/00 |
| 0 731008 | 9/1996 | European Pat. Off. | B60R 25/10 |
| 2541801 | 8/1984 | France | G08B 25/00 |
| 2709853 | 3/1995 | France | G08B 26/00 |
| 3805810 | 9/1989 | Germany | G08G 1/00 |
| 4203865 | 3/1993 | Germany | G01S 5/02 |
| 4321417 | 1/1995 | Germany | G01S 13/74 |
| 08136639 | 8/1996 | Japan | G01S 5/14 |
| 2079837 | 1/1982 | United Kingdom | E05B 47/00 |
| 2233487 | 1/1991 | United Kingdom | B60R 25/00 |
| 2310251 | 8/1997 | United Kingdom | B60R 25/04 |
| 93/05490 | 3/1993 | WIPO | G08B 25/01 |
| 95/13943 | 5/1995 | WIPO | B60R 25/04 |

*Primary Examiner*—Daniel J. Wu
*Attorney, Agent, or Firm*—Limbach & Limbach LLP

[57] ABSTRACT

This invention discloses a vehicle theft prevention system which is operative to communicate with a central control station that transmits control signals to the vehicle, the system including an antenna, a receiving unit coupled to the antenna and operative to receive, via the antenna, the control signals transmitted by the central control station, and a processor which is operative to apply interference to operation of at least one critical engine component in the vehicle after an interruption in reception of the control signals at the receiving unit. A method of preventing a theft of a vehicle is also disclosed.

50 Claims, 7 Drawing Sheets

THEFT PREVENTION SYSTEM AND METHOD

FIELD OF THE INVENTION

The present invention relates to theft prevention systems generally and more particularly to vehicle theft prevention systems.

BACKGROUND OF THE INVENTION

There are known in the art vehicle theft prevention systems in which the position of a vehicle is measured by using a GPS (Global Positioning System) receiver which is fixedly mounted in a vehicle and receives signals from GPS satellites via a GPS antenna. When the vehicle is stolen, a transmitter in the vehicle transmits the position of the vehicle, and a central station pursues the position of the concerned vehicle.

However, many thieves have found ways to overcome theft prevention systems in which GPS information is utilized by breaking the GPS antenna. In such a case, no signal arrives at the vehicle and the theft prevention systems cannot be utilized.

Other vehicle theft prevention systems which are known in the art include immobilizer circuits which disable the vehicle's engine upon detection of a theft or an unauthorized movement of the vehicle.

Some of the theft prevention systems which are found in the art are described hereinbelow.

Japanese Patent Application JP 08136639 describes a method which involves measuring the position of a concerned vehicle (V) by a GPS receiver which is mounted on each vehicle. For each vehicle a predetermined management area (A) is set beforehand. The set management area is compared with the management area detected by the GPS receiver during theft. A radio mounted on the vehicle indicates the position of the theft vehicle. A vehicle administration bureau (M) pursues the position of the concerned vehicle. The position of the other external vehicle in the predetermined management area is also pursued.

Belgian Patent Application BE 1007815 describes a system which is linked via internal antennas, a built in communications module and communications satellites to one or more automatically operated earth based centers. The system has sensors which detect horizontal or vertical movements of the vehicle, unauthorized use or attempts to disable the system. The system has an "intelligent interpretation unit" which controls the communications signal exchanges and drives a visual signal unit. If the system or the remote center determines that the vehicle is being moved without authorization, the engine can be disabled.

World Patent Application WO 9513943 describes a system for remotely tripping a switch which uses a receiver which is located in the remote location. An unassisted telephone call is made by the owner, who is located in the remote location, and intercepted by the receiver. A tripping circuit responds to the receiver and trips a switch. Preferably, upon receiving the signal, the receiver sends an input signal to the tripping circuit. In response to the signal the tripping circuit trips the switch, thereby interrupting the vehicles ignition, and/or activates a vehicle alarm system or vehicle homing transmitter. The unassisted telephone call includes a predetermined remote location telephone number and a predetermined security code. The telephone number corresponds to the remote receiver.

French Patent Application FR 2709853 describes a system in which satellites generate signals which are received by a car installation. The car has a satellite antenna and receiver allowing the signals to locate the car position, and create digital navigation information. If the car alarm has been set off, this navigation information is passed to a central radio-communication tower. The tower passes the information to a central unit where the positional information is processed. The information is passed to a message acquisition module and placed in memory. The positional information is then verified by a calculator and finally passed to a man/machine interface to be displayed.

German Patent Application DE 4321417 describes an alarm device installed in or on the missing vehicle, or a pulse triggered by an external interrogating radio signal, which initiates the transmission of encoded radio signals by an on-board transponder. A wide-area network of reception sites for the transponder outputs is connected to a central station where the received signals are processed together with the map references of vehicles and/or the sites at which their transmissions are detected.

U.S. Pat. No. 5,223,844 describes a mobile unit which includes an input unit, responsive to an event or condition associated with a vehicle, and which provides information describing the event or condition. A satellite receiver, responsive to navigation signals transmitted by a satellite navigation system, provides information inherently describing the vehicle's location based on the navigation signals. A mobile unit controller, responsive to the input unit and the satellite receiver includes a cellular telephone transmitter for transmitting information onto a cellular telephone communication link.

World Patent Application WO 9305490 describes an alarm system in which a locator determines a vehicle position via global positioning signals from a satellite, at predetermined time intervals. A memory stores at least the most recent coordinate in memory and a transmitter sends signals to a remote facility when a trigger unit is actuated.

German Patent Application DE 4203865 describes apparatus which includes a location device which determines the actual position of a vehicle via satellite location in specific time intervals. A radio transmitter sends signals when a trigger device is actuated contingent the momentary or last specific position of the vehicle. A memory unit stores at least the last specific position of the vehicle and the radio transmitter may be tuned to the receiving equipment of emergency services. The release device has an alarm wire which activates the signal when a break-in occurs, and which is arranged in the closure or hinge area of a container or space to be secured and/or for securing a container walling.

U.S. Pat. No. 4,918,425 describes a transponder which responds to signals transmitted by a base station and indicates by an alarm the absence of appropriate response from the transponder. The base is capable of participating in homing techniques to locate a load transponder. A list of the IDs of all transponders reported missing is distributed from a central source by nationwide communication to a network of radio stations. Each station broadcasts the list in an encoded signal in repetitive sequence along with regular programming.

German Patent Application DE 3805810 describes a road vehicle which has an on board computer that operates together with the vehicle radio to provide a signal transmission link that enables the location of the vehicle to be fixed. The vehicle is identified by a code that is stored in system memory. The vehicle movement is related to road maps and is fixed by a navigation system which can be provided by satellite. Information regarding vehicle speed and location can be transmitted over the radio communication system. In the event of theft the location can be fixed. Any damage to the aerial causes an alarm to triggers.

French Patent Application FR 2541801 describes a surveillance system which includes a permanent emergency station equipped with a radio. A set of mobile alarm units are attached to each of the vehicles to be protected. Each alarm unit includes a system using signals emitted by satellites to locate its position, a compass, and a speed detector to sense its movement. The last two components allow movement of the vehicle to be monitored between the passage of satellites. The alarm units also include an interface and keyboard for control codes, as well as batteries and detectors sensing attempted theft.

SUMMARY OF THE INVENTION

The present invention seeks to provide vehicle theft prevention systems and methods which overcome discontinuity and interruption of communication between a central control station and the vehicle.

There is thus provided, in accordance with a preferred embodiment of the present invention, a vehicle theft prevention system, for use in a vehicle, wherein the vehicle theft prevention system is operative to communicate with a central control station that transmits control signals to the vehicle, and the system includes:

an antenna;

a receiving unit coupled to the antenna and operative to receive, via the antenna, the control signals transmitted by the central control station; and a processor which is operative to apply interference to operation of at least one critical engine component in the vehicle after an interruption in reception of the control signals at the receiving unit.

Preferably, the interference is applied a pre-determined time period after the interruption in reception of the control signals at the receiving unit. The interference preferably includes interruption of operation of the at least one critical engine component.

In a preferred embodiment of the present invention the predetermined time period is of the order of a few minutes.

Preferably, the control signals include digital signals including periodic control word packets. The digital signals include compressed digital signals.

In accordance with a preferred embodiment of the present invention the system includes a compressor/decompressor which is operative to decompress the compressed digital signals. Additionally, the control signals are encrypted, and the system includes an encryptor/decrypter which is operative to decrypt the encrypted control signals.

Preferably, the system also includes:

a speaker interface which is coupled to the processor and is operative to receive from the processor instructions for playing at least one of voice messages and alarm signals; and a speaker which is coupled to the speaker interface and is operative to play the at least one of the voice messages and the alarm signals.

The system also includes an engine interface which is coupled to the processor and to the at least one critical engine component, wherein the engine interface is operative to interfere with the operation of the at least one critical engine component in response to an instruction provided by the processor.

Additionally, the system includes a display for displaying visual messages in response to an instruction provided by the processor.

Preferably, the system also includes:

a video camera interface which is coupled to the processor and is operative to receive from the processor instructions for photographing; and a video camera which is coupled to the video camera interface and is operative to photograph a driver in the vehicle.

In accordance with a preferred embodiment of the present invention the system also includes a vehicle transmitting unit which is coupled to the video camera and to the processor and is operative to transmit at least video pictures of the driver and the voice messages to the central control station via the antenna.

Preferably, the vehicle transmitting unit is also coupled to the compressor/decompressor for compressing information which is to be transmitted to the central control station prior to transmission thereto.

Additionally, the vehicle transmitting unit is also coupled to the encryptor/decrypter for encrypting information which is to be transmitted to the central control station prior to transmission thereto.

Preferably, the system also includes a memory which is coupled to the processor and is operative to store any of warning messages and pictures of a driver. The memory is operative to store at least one of the following: any information that is played to a driver and any information that is displayed to a driver.

Additionally, the memory is operative to store at least one of a time when video pictures are photographed, a time of a theft of the vehicle, a location of the vehicle, and a velocity of the vehicle.

In a preferred embodiment of the present invention the system also includes monitoring circuitry which is operative to monitor the status of at least one of the receiving unit, the antenna control circuitry, the processor and the card reader.

Additionally, the system includes a keyboard for entering at least one of user data and installer data. The user data includes at least one of a user code and a delay period after which the interference to operation of at least one critical engine component is applied.

Preferably, the installer data includes a delay period, after which the interference to operation of at least one critical engine component is applied.

Further, the system preferably includes a card reader which is coupled to the processor and is operative to communicate with a smart card, wherein the smart card is operative to control access to the vehicle.

There is also provided in accordance with a preferred embodiment of the present invention a vehicle theft prevention system, for use in a vehicle, wherein the vehicle theft prevention system is operative to communicate with a central control station which transmits control signals to the vehicle, and the system includes:

a first antenna and a second antenna, each operative to receive the control signals transmitted by the central control station;

antenna control circuitry which is operative to compare signals received at the first antenna with signals received at the second antenna and to provide a determination of an interruption of reception of the control signals at at least one of the first antenna and the second antenna; and a processor coupled to the antenna control circuitry and operative to determine a theft of the vehicle in accordance with the determination of the interruption of reception of the control signals at the at least one of the first antenna and the second antenna.

Preferably, the antenna control circuitry includes:
a comparator which is operative to compare signals received at the first antenna with signals received at the second antenna and to generate a comparison signal;
a micro-controller which is coupled to the comparator and is operative to receive the comparison signal and to generate an instruction in response to the comparison signal; and
a selector which is coupled to the micro-controller and to the comparator and is operative to select one of signals received at the first antenna and signals received at the second antenna in response to the instruction provided by the micro-controller.

Additionally, the antenna control circuitry also includes a memory which is coupled to the micro-controller and is operative to store threshold values which are employed by the micro-controller to determine quality of operation of the first antenna and of the second antenna.

There is also provided in accordance with a preferred embodiment of the present invention a method of preventing a theft of a vehicle, the method being employed with a vehicle mounted system which is operative to communicate with a central control station which transmits control signals to the vehicle, the method including:
receiving the control signals via an antenna; and
applying interference to operation of at least one critical engine component in the vehicle when the receiving of the control signals is interrupted.

Preferably, the applying step includes activating the interference to operation of at least one critical engine component in the vehicle a predetermined time period after the receiving of the control signals is interrupted. The interference includes interruption of the operation of the at least one critical engine component.

Additionally, the method includes:
determining that the vehicle is stolen by a thief; and
providing a warning message to inform the thief that the engine will be turned off after a delay period.

Preferably, the delay period is of the order of a few minutes.

In accordance with a preferred embodiment of the present invention the step of providing a warning message includes generating at least one of a voice message, a visual warning message and an alarm signal.

Preferably, the method also includes photographing a driver in response to the determining step.

Additionally, the method includes storing at least one of information that is provided to the thief and pictures of the thief.

Further in accordance with a preferred embodiment of the present invention the method includes transmitting information indicating a theft of the vehicle to the central control station in response to the determining step.

Preferably, the transmitting step also includes transmitting information including at least one of a time of the theft of the vehicle, a time at which the pictures of the thief have been taken, a location of the vehicle, and a velocity of the vehicle.

Additionally, the method includes compressing the information prior to the transmitting step. The method also includes encrypting the information prior to the transmitting step.

Preferably, the step of determining that the vehicle is stolen by a thief includes determining that a valid smart card is not inserted in a smart card reader within a pre-determined time period after ignition of the vehicle.

Additionally, the step of determining that the vehicle is stolen by a thief includes:
generating a message requesting a driver to enter a user code; and
determining that the driver does not insert the user code during a pre-determined time period.

In accordance with another preferred embodiment of the present invention there is provided a method for preventing theft of a vehicle, the method being employed with a vehicle mounted system which is operative to communicate with a central control station which transmits control signals to the vehicle, the method including:
providing a first antenna and a second antenna, wherein each of the first antenna and the second antenna is operative to receive the control signals transmitted by the central control station;
comparing signals received at the first antenna with signals received at the second antenna to provide a difference signal indicating at least one of a difference in signal level and a difference in signal phase between the signals received at the first antenna and the signals received at the second antenna;
determining an interruption of reception of the control signals at at least one of the first antenna and the second antenna; and
generating an indication of a theft of the vehicle in response to the determining step.

Additionally, the method includes:
selecting one of the signals received at the first antenna and the signals received at the second antenna in response to an instruction provided by a micro-controller; and
providing the selected signals to a processor.

Preferably, the determining step includes:
comparing a level of the difference signal with a level threshold value;
comparing a phase of the difference signal with a phase threshold value; and
determining an interruption of reception of the control signals at at least one of the first antenna and the second antenna when at least one of the level of the difference signal and the phase of the difference signal exceeds the level threshold value and the phase threshold value respectively.

Additionally, the method includes storing the level threshold value and the phase threshold value in a memory.

There is also provided in accordance with a preferred embodiment of the present invention a method of distinguishing between a vehicle theft and an interference in communication in a theft prevention system which is mounted in the vehicle and which communicates with a central control station that transmits control signals which are received at the theft prevention system, the method including:
comparing signals received at the theft prevention system at a first time period with signals received at the theft prevention system at a second time period;
determining an interference of communication upon detection of a continuous fade out in reception of the signals received at the second time period with respect to the signals received at the first time period; and
determining a vehicle theft when the signals received at the second time period are substantially of zero level.

Further in accordance with a preferred embodiment of the present invention the control word packets include personalized control word packets.

Still further in accordance with a preferred embodiment of the present invention the method also includes transmitting a vehicle theft signal from the theft prevention system, the vehicle theft signal comprising an identification of the vehicle.

Additionally in accordance with a preferred embodiment of the present invention the control signals include digital signals comprising periodic control word packets.

Moreover in accordance with a preferred embodiment of the present invention the control word packets include personalized control word packets.

Further in accordance with a preferred embodiment of the present invention the control word packets include personalization information and the identification of the vehicle includes the personalization information.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
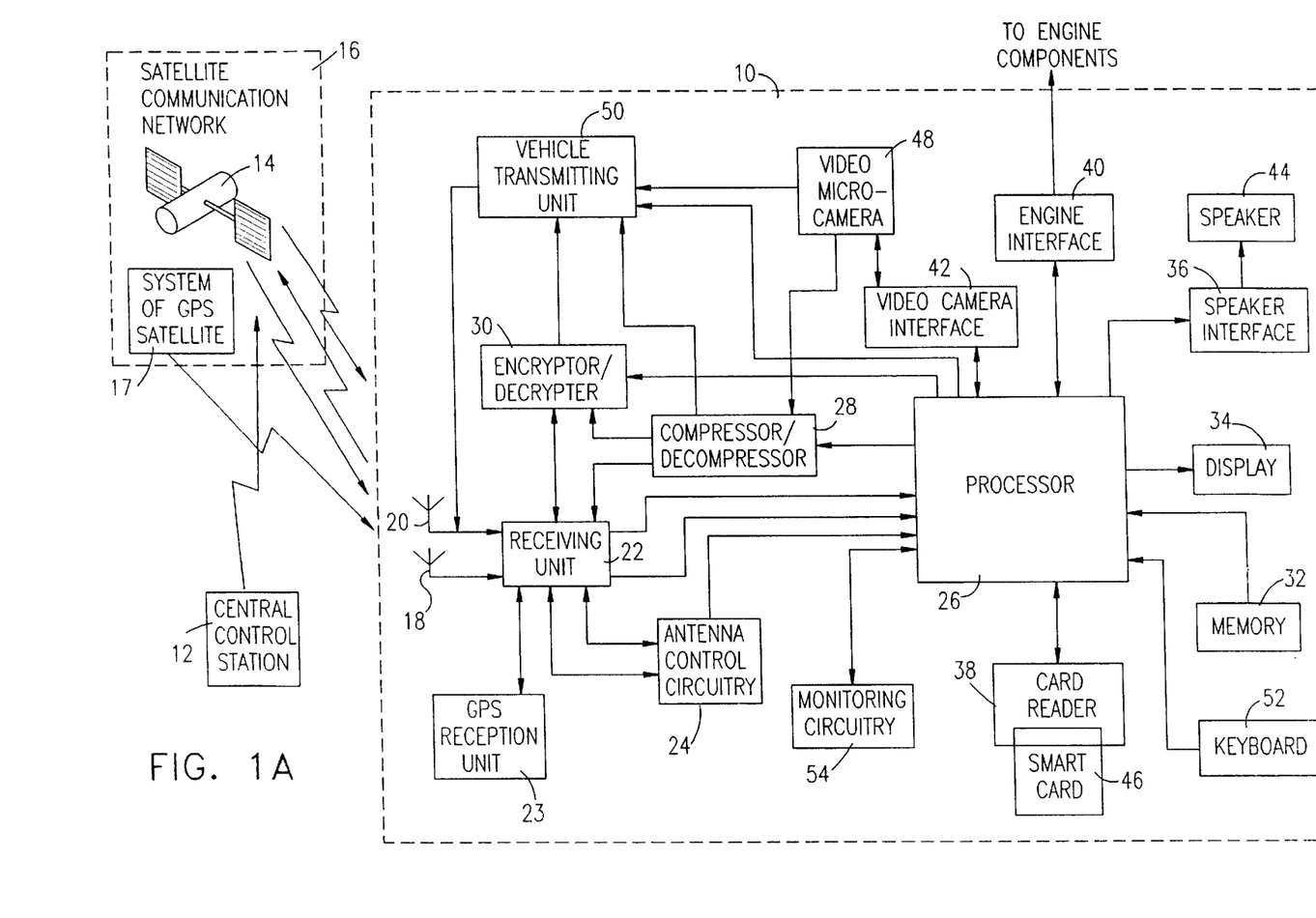
FIG. 1A is a generalized block diagram illustration of a vehicle theft prevention system constructed and operative in accordance with a preferred embodiment of the present invention.
Figure 1B:
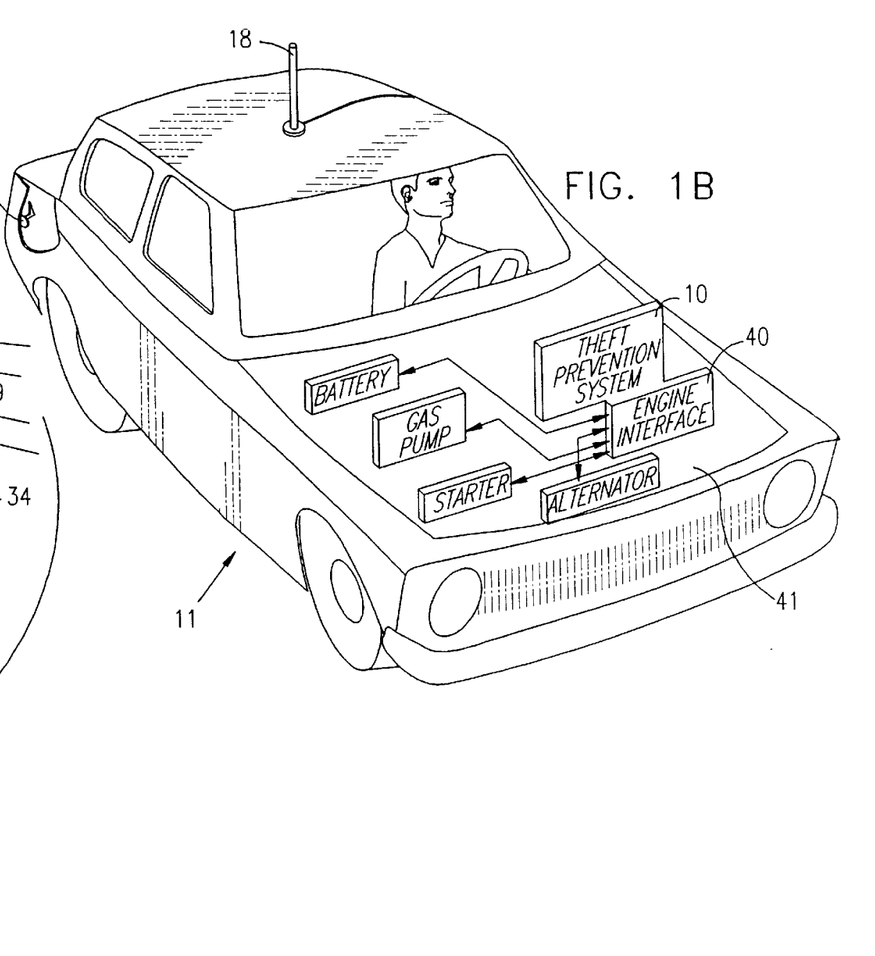
FIG. 1B is a partially pictorial, partially block diagram illustration of the vehicle theft prevention system of FIG. 1A as installed in a vehicle.
Figure 1C:
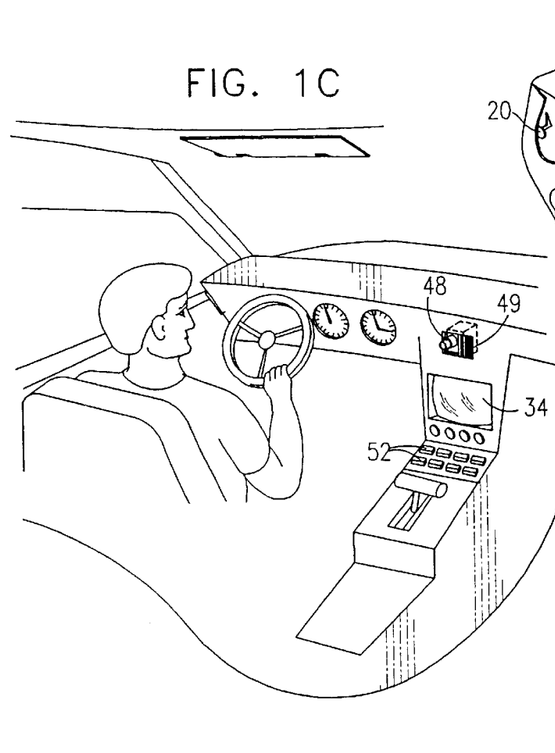
FIG. 1C is a pictorial illustration of the portion of the vehicle theft prevention system of FIG. 1A as installed in the inside of the cabin of the vehicle.

Reference is now made to FIG. 1A, which is a generalized block diagram illustration of a vehicle theft prevention system 10 constructed and operative in accordance with a preferred embodiment of the present invention, and to FIGS. 1B and 1C which are partly pictorial, partly block diagram illustrations of the vehicle theft prevention system of FIG. 1A as installed in a vehicle 11.

Vehicle theft prevention system 10 is operative to communicate with a central control station 12 via a satellite 14 which forms part of a satellite communication network 16. Central control station 12 transmits data and control signals, which may be either digital signals, typically in the form of periodic control word packets, or analog signals. Preferably, particularly in the case of control word packets, the control signals are personalized, that is, different vehicles comprising the vehicle theft prevention system 10 receive different control packets. Information comprised in a personalized control word packet, by which a control word packet intended for one vehicle differs from a control word packet intended for another vehicle, is termed herein "personalization information". In such a case the vehicle theft prevention system 10 preferably ignores control packets not intended for that vehicle.

It is to be appreciated that satellite communication network 16 may be replaced by a ground cellular communication network. In that case, satellite 14 is replaced by a ground relay antenna system, which is operative to enable communication between central control station 12 and vehicle theft prevention system 10.

The data and control signals that are provided by central control station 12 are preferably transmitted in a continuous mode and are received at an antenna 18 and at an antenna 20 which form part of vehicle theft prevention system 10. Vehicle theft prevention system 10 is preferably mounted in vehicle 11.

Preferably, antenna 18 is mounted at a visible location in vehicle 11, such as on the vehicle roof as illustrated in FIG. 1B. Antenna 20 is preferably a hidden antenna which is mounted at a concealed location in vehicle 11, such as in the vehicle trunk as illustrated in FIG. 1B. It is appreciated that antenna 20 is preferably of such a type, and mounted in such a location, that good reception may occur at antenna 20 despite the concealed location thereof.

Antennas 18 and 20 are both coupled to a receiving unit 22. Preferably, receiving unit 22 includes conventional receiving, amplifying and demultiplexing circuitry, and is operative to provide the data and control signals received thereat to antenna control circuitry 24 and to a processor 26, which may preferably be a conventional processor.

In a preferred embodiment of the present invention satellite communication network 16 may also include a system of GPS satellites 17 which provides positioning information. In such a case, antennas 18 and 20 may also be adapted to receive GPS positioning information.

The GPS positioning information received via antennas 18 and 20 may be decoded at a GPS reception unit 23 which may be coupled to receiving unit 22. Alternatively, the GPS positioning information may be received via a separate GPS antenna (not shown) which may be directly coupled to GPS reception unit 23.

It is to be appreciated that if network 16 is a cellular communication network, receiving unit 22 may preferably be a cellular communication receiver, as available in conventional cellular telephones.

If the data and control signals provided by central control station 12 and received at receiving unit 22 are analog signals, receiving unit 22 may also include an analog-to-digital converter (not shown) for converting analog signals to digital signals which are processed at processor 26.

In a preferred embodiment of the present invention the data and control signals transmitted by central control station 12 and received at receiving unit 22 include digital compressed signals. In such a case, receiving unit 22 may be coupled to a compressor/decompressor 28 which is operative to decompress the compressed data received at receiving unit 22.

In another preferred embodiment of the present invention the data and control signals transmitted by central control station 12 and received at receiving unit 22 may be also encrypted. In such a case, receiving unit 22 may be coupled to an encryptor/decrypter 30 which is operative to decrypt the data received at receiving unit 22.

It is to be appreciated that in the case where the received data and control signals are encrypted and compressed digital signals, the received signals are preferably first decrypted and then decompressed to provide the signals in a clear form. If the communicated signals are encrypted analog signals, encryptor/decrypter 30 may include an analog encryptor/decrypter (not shown).

Preferably, antenna control circuitry 24 is operative to determine the quality of operation of antenna 18 and of antenna 20 as described in detail herein below with reference to FIG. 3. Antenna control circuitry 24 preferably provides a signal indicating the quality of operation of antenna 18 and of antenna 20 to processor 26. It is to be appreciated that antenna control circuitry 24 may alternatively be part of receiving unit 22.

In a preferred embodiment of the present invention processor 26 communicates with the following units: a memory 32, a display 34, a speaker interface 36, a card reader 38, an engine interface 40, compressor/decompressor 28, a video camera interface 42, encryptor/decrypter 30, monitoring unit 54, keyboard 52 and antenna control circuitry 24, all of which may be appropriate conventional components.

Speaker interface 36 preferably includes a DSP (Digital Signal Processing) unit (not shown) which is operative to control operation of a speaker 44 in response to instructions received from processor 26.

Card reader 38 is preferably a conventional IC (Integrated Circuit) card reader and is operative to read data from and write data to a smart card 46.

In a preferred embodiment of the present invention engine interface 40 is coupled to one or more conventional critical engine components such as a starter, an alternator, a battery, a distributor, a gas pump and an automatic gear transmission, and is operative to control operation of the critical engine components in response to instructions provided by processor 26 as described herein below with reference to FIG. 2. Some of the above mentioned conventional critical engine components are illustrated in FIG. 1B as installed in an engine compartment 41.

Video camera interface 42 is operative to control operation of a video camera 48 (FIG. 1C) in response to instructions received from processor 26. Preferably, video camera 48 is a micro-camera which is mounted at a hidden location in vehicle 11 and is positioned to take pictures of a driver's face.

It is to be appreciated that video camera 48 may be mounted behind a panel 49 which may slide to expose video camera 48 and to enable video camera 48 to photograph the driver in response to a signal provided by video camera interface 42.

Processor 26 and video camera 48 are each coupled to a vehicle transmitting unit 50 which is operative to transmit data relating to a theft of vehicle 11, and video signals to central control station 12 via hidden antenna 20. Preferably, the data includes personalization data identifying the vehicle, which personalization data may include data from a previously received personalized control word packet, as described above. It is to be appreciated that vehicle transmitting unit 50 typically includes all conventional multiplexing, modulating, combining and amplifying circuitry required for transmission of the data and the video signals.

If the transmission involves analog signals, vehicle transmitting unit 50 also includes a digital-to-analog converter for converting digital signals, provided by processor 26, to analog signals.

If network 16 employs compressed digital information, the data and video signals, provided by processor 26 and video camera 48 respectively, may be compressed at compressor/decompressor 28 prior to transmission by vehicle transmitting unit 50.

Preferably, network 16 may employ encrypted information. In such a case, the data and video signals, provided by processor 26 and by video camera 48 respectively, may be encrypted at encryptor/decrypter 30 prior to transmission by vehicle transmitting unit 50.

In another preferred embodiment of the present invention data and video signals generated by processor 26 and by video camera 48 may be compressed at compressor/decompressor 28 and encrypted at encryptor/decrypter 30 prior to transmission thereof.

Processor 26 may be programmed by a user, typically the vehicle owner, or by an installer via a keyboard 52 which is coupled thereto. Preferably, the programming may include entering time period selections and system configurations as described herein below with reference to FIG. 2.

In a preferred embodiment of the present invention processor 26 is also coupled to monitoring circuitry 54. The functionality of monitoring circuitry 54 is described her-in after with reference to FIGS. 5A and 5B.

Figure 2:
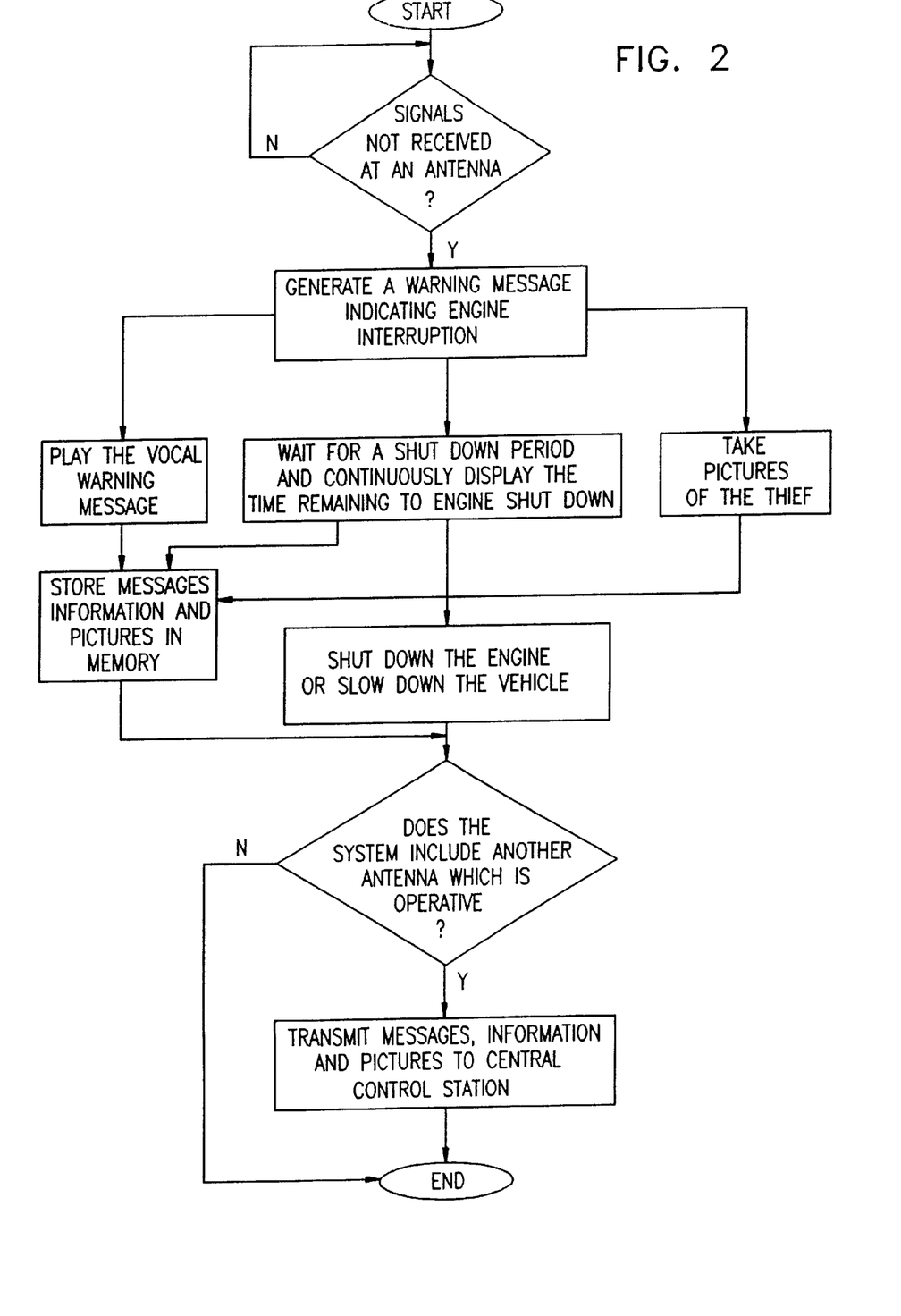
FIG. 2 is a flow chart illustrating a preferred method of operation of the theft prevention system of FIGS. 1A and 1B in accordance with a preferred embodiment of the present invention.

Reference is now made to FIG. 2 which is a flow chart illustrating a preferred method of operation of the theft prevention system of FIGS. 1A, 1B and 1C.

Vehicle theft prevention system 10 of FIGS. 1A, 1B and 1C may be operated with either one or two antennas. When vehicle theft prevention system 10 is operated in a configuration in which only one antenna is employed, the antenna may be antenna 18. In a configuration in which two antennas are employed, antenna 20 may be added.

If a thief steals vehicle 11 and breaks an antenna, reception at the broken antenna is interrupted, and signals from the broken antenna cease to be provided via receiving unit 22 to processor 26. If only one antenna is employed in the system, vehicle theft prevention system 10 ceases to receive any signals at all from central control station 12.

In the configuration in which only antenna 18 is employed and when no signals are received at vehicle theft prevention system 10. processor 26 may send an interrupt signal which instructs engine interface 40 to cause interference to operation of one critical engine component, or a plurality of critical engine components. The interference may include interruption of the operation of the critical engine component, or the plurality of critical engine components.

Preferably, the operation of a critical engine component is not interrupted immediately. Rather, interruption of the critical engine component is delayed for a delay period which is typically of the order of a few minutes, such as 5 minutes.

Additionally or alternatively, processor 26 may generate a visual warning message, prior to interruption of the operation of the critical engine component or components. The warning message may inform the thief that the engine is going to be turned off, or that the vehicle is going to slow down after the delay period elapses.

In a preferred embodiment of the present invention the visual warning message may be displayed on display 34. If display 34 is not turned on, processor 26 may turn on display 34 and display the warning message on display 34.

Preferably, the warning message may be displayed continuously during the delay period, or periodically at some predetermined time interval, such as every 10 seconds, so as to inform the thief about the time remaining before the engine is turned off. Preferably, the information about the time remaining before the engine is turned off includes display of a continuously changing time on a clock.

This feature is used to prevent the thief from causing an accident, possibly contributed to by operation of the theft prevention system. Such an accident could be caused, for example, by the thief dangerously maneuvering the vehicle, since, due to the action of the theft prevention system, the engine may be turned off, or the vehicle may slow down during a dangerous maneuver. and the thief may lose control of the vehicle and cause an accident.

It is to be appreciated that the delay period may be selected by the installer via keyboard 52, or determined at time of manufacture, or at another time.

After the delay period elapses, processor 26 instructs engine interface 40 to stop the operation of at least one critical engine component to which interface 40 is coupled. Preferably, the operation of a critical engine component may be interrupted by electrical disconnection or by an electro-mechanical operation, such as closing of a valve to cut supply of gas or a fluid as is well known in the art.

Alternatively or additionally, the operation of the automatic gear transmission may be interfered by disabling gear changing, and allowing the automatic gear transmission to operate only in low velocities, thus slowing down the vehicle.

The visual warning message displayed on display 34 may be accompanied by a vocal warning message. In such a case, processor 26 may instruct speaker interface 36 to play the message via speaker 44. Preferably, the vocal warning message informs the thief of the time remaining till the engine is turned off.

Alternatively or additionally, a vocal alarm signal, which may be similar to alarm signals generated by conventional vehicle alarm systems, may be generated via speaker 44.

In a preferred embodiment of the present invention the visual warning message and the vocal warning message may be pre-programmed messages which are originally stored in memory 32 and retrieved from memory 32 by processor 26. Alternatively. the visual warning message and the vocal warning message may be part of the data transmitted to vehicle theft prevention system 10 by central control station 12.

In another preferred embodiment of the present invention processor 26 may instruct video camera interface 42 to operate video camera 48 and to take pictures of the thief. Preferably, the pictures are stored in memory 32.

It is to be appreciated that memory 32 may be also employed as a "black box" to store any information that is played and displayed to the thief and information which is related to the theft of the vehicle. In such a case, the information may be regenerated and provided as evidence when the vehicle is found.

In another preferred embodiment of the present invention, interface units 36, 40 and 42 may be mounted in hidden locations in the vehicle, so that it may be difficult for the thief to locate them and to disconnect them.

If theft prevention system 10 employs two antennas, i.e. antenna 18 and antenna 20, and the thief breaks only one of the antennas, such as antenna 18, antenna 20 may be used to transmit information to central control station 12.

In such a case, when vehicle theft prevention system 10 ceases to receive signals from antenna 18, processor 26 determines that the vehicle is stolen, and generates an indication of the theft of the vehicle. Processor 26 also provides the warning messages and information related to the theft of the vehicle to vehicle transmitting unit 50 which prepares the information for transmission via antenna 20.

In a preferred embodiment of the present invention processor 26 instructs video camera interface 42 to enable video camera 48 to provide the video pictures of the thief to vehicle transmitting unit 50. Vehicle transmitting unit 50 combines the video pictures and the information provided by processor 26 and transmits the combined information via antenna 20 to central control station 12.

Preferably, the information related to the theft of the vehicle may include the time of the theft, the time at which the pictures of the driver have been taken, and other general data, such as the velocity of the vehicle. This information may be obtained from conventional units (not shown) in the vehicle, such as a clock, and a velocity meter.

Additionally, the information related to the theft of the vehicle may include the location of the vehicle. This information may be obtained in a conventional manner from GPS reception unit 23, and combined with the other theft related information.

It is to be appreciated that any information which is stored and/or transmitted to central control station 12 may be compressed at compressor 28 and/or encrypted at encryptor 30 prior to storage and/or transmission as described herein above.

In the case in which antenna 20 is operative and may be employed for reception of information from central control station 12, as well as for transmission to central control station 12, more complex warning messages may be displayed and played to the driver. Such warnings may include short video movies in which the thief is warned that the theft of the vehicle is registered and that the vehicle is being chased. The video movies may be either stored in memory 32 or transmitted by central control station 12 to vehicle theft prevention system 10.

In another preferred embodiment of the present invention a smart card may be employed to determine whether the vehicle is stolen. In such a case, unless a valid smart card, such as smart card 46, is inserted in smart card reader 38 within a short time period after ignition of the vehicle, the vehicle is determined as stolen. Preferably, the short time period may be of the order of 1 minute, and may be pre-programmed by the user.

Thus, if the thief drives the vehicle without inserting smart card 46 in smart card reader 38, smart card reader 38 provides processor 26 an indication of the lack of a valid smart card, and processor 26 determines a theft of the vehicle. Then, processor 26 may perform the same operations as mentioned before to inform the theft and to warn the thief, i.e. generate the warning messages, take pictures of the thief, store the warning messages and transmit information about the theft of the vehicle to central control station 12.

Figure 3:
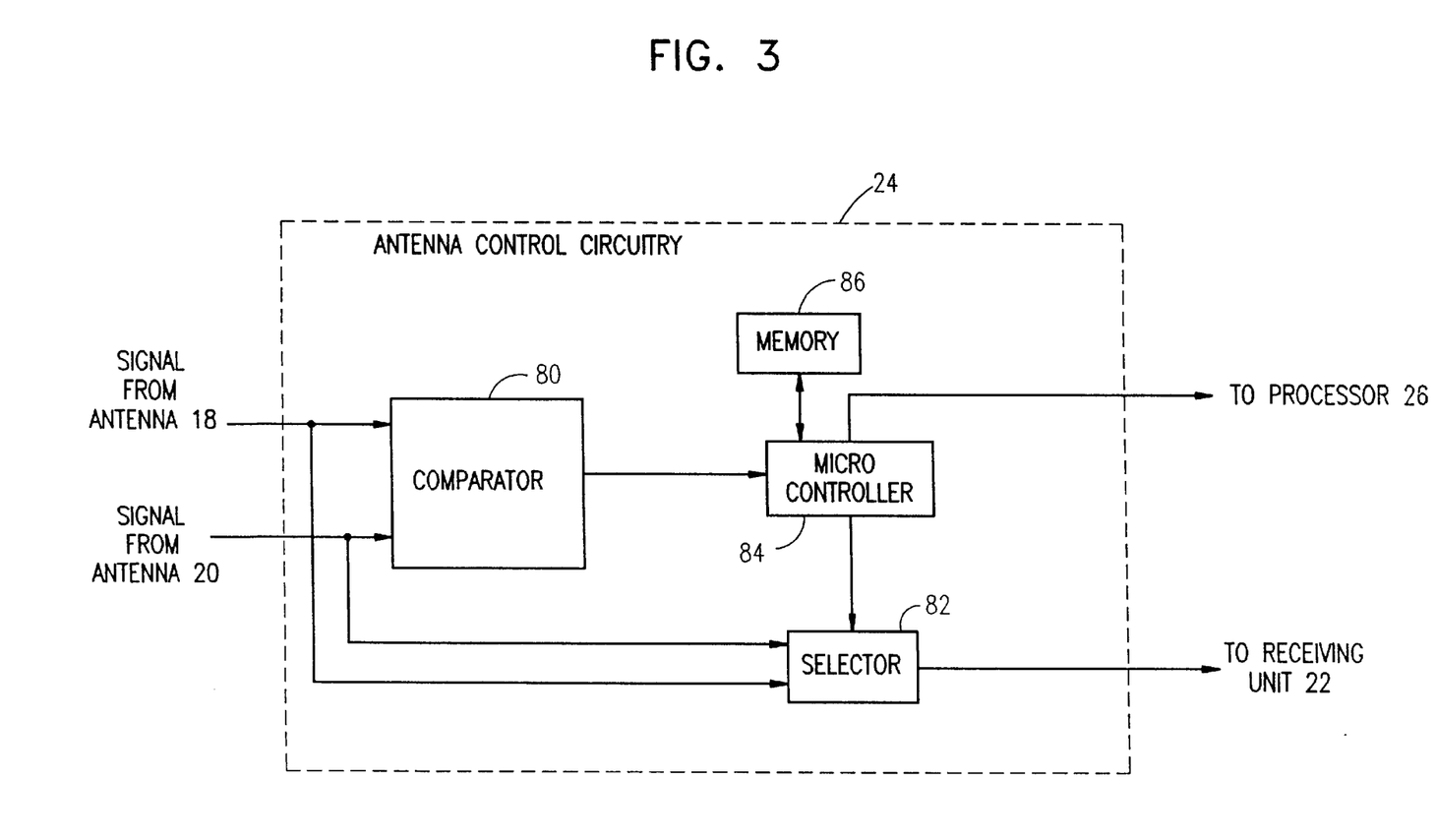
FIG. 3 is a generalized block diagram illustration of a portion of the system of FIG. 1A constructed and operative in accordance with a preferred embodiment of the present invention.

Reference is now made to FIG. 3 which is a generalized block diagram illustrating a preferred embodiment of antenna control circuitry 24 which forms part of the vehicle theft prevention system of FIG. 1A.

The structure and functionality of antenna control circuitry 24 is described herein after with reference to vehicle theft prevention system 10 of FIGS. 1A and 1B which includes both antenna 18 and antenna 20. It is to be appreciated that antenna control circuitry 24 may be excluded if only one antenna is employed in vehicle theft prevention system 10.

Signals received at antenna 18 and at antenna 20 are fed to a comparator 80 and to a selector 82 in antenna control circuitry 24. Preferably, the signals include the control signals as mentioned above with reference to FIGS. 1A and 1B.

Comparator 80 preferably includes conventional electronic circuitry which enables comparison of at least two signals which are separately fed. Selector 82 preferably includes conventional electronic circuitry which enables selection of a signal from two signals which are separately fed, or a selection of at least one signal from a plurality of signals which are separately fed.

In a preferred embodiment of the present invention comparator 80 is coupled to a micro-controller 84 which is operative to control the operation of selector 82 and to enable selector 82 to provide a selected one of the signals received at antenna 18 and at antenna 20 to receiving unit 22. Preferably, micro-controller 84 communicates with a memory 86.

If antennas 18 and 20 are connected to vehicle theft prevention system 10, and both antennas 18 and 20 operate properly, then each of the antennas 18 and 20 receives control signals transrrmitted by central control station 12 via satellite 14. It is to be appreciated that occasionally, there may be some difference in signal level and in signal phase between signals received at antenna 18 and signals received at antenna 20 due to factors such as random electromagnetic noise, and the separate locations of antennas 18 and 20.

Preferably, comparator 80 compares the control signals received at antenna 18 and the corresponding control signals received at antenna 20 and provides a difference signal to micro-controller 84. In a preferred embodiment of the present invention the difference signal is processed in micro-controller 84 and employed to control the output of selector 82 and to determine whether the vehicle is stolen as described hereinafter with reference to FIG. 4.

Figure 4:
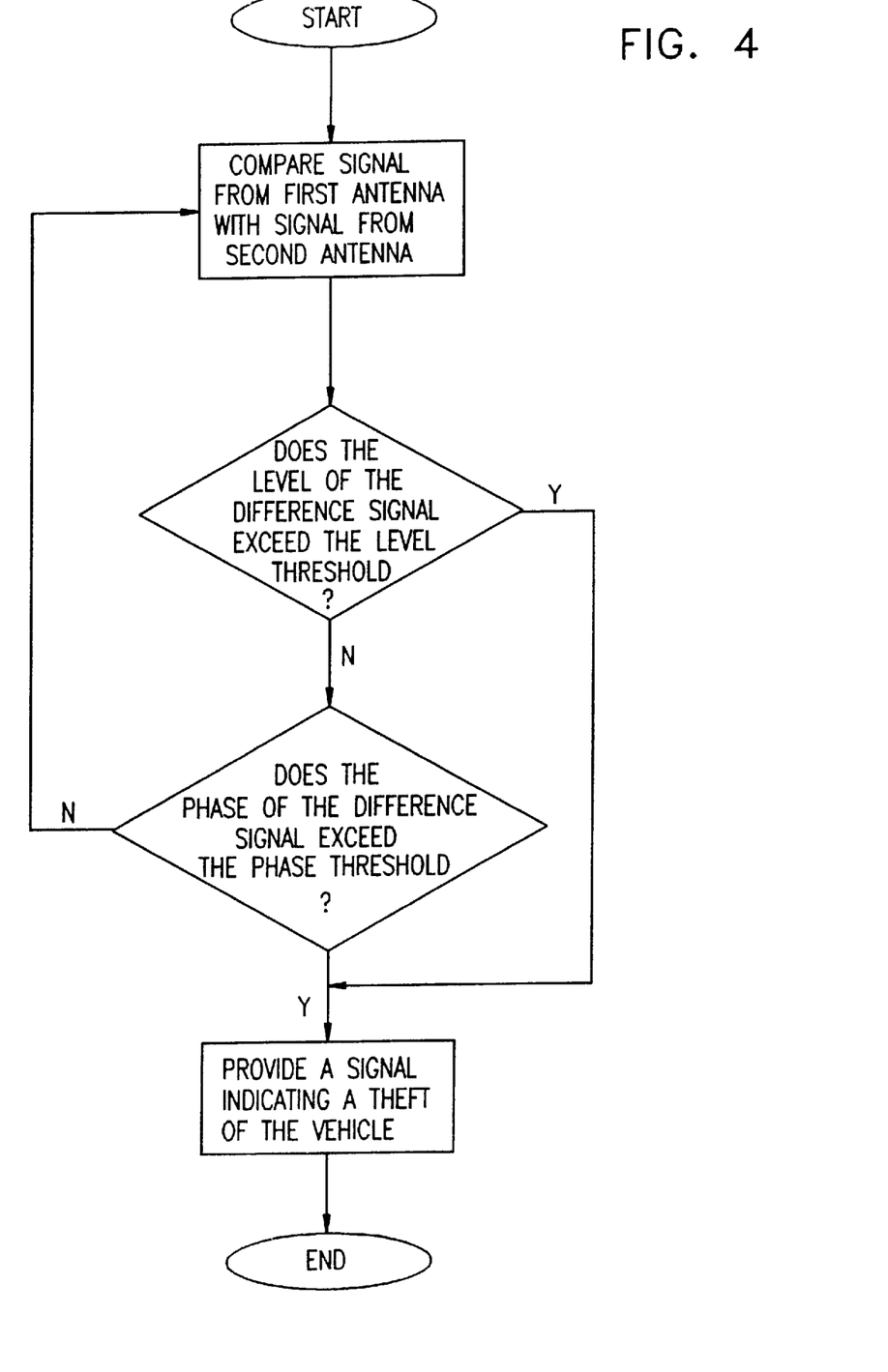
FIG. 4 is a flow chart illustrating a preferred method of operation of the system of FIG. 3 in accordance with a preferred embodiment of the present invention.

Reference is now made to FIG. 4 which is a flow chart illustrating a preferred method of operation of antenna control circuitry 24 of FIG. 3 in accordance with a preferred embodiment of the present invention.

The level and the phase of the difference signal, which is provided by comparator 80 to micro-controller 84, are compared to a level threshold value and to a phase threshold value respectively. If both the difference signal level and the difference signal phase are below the respective threshold values. then micro-controller 84 determines that the vehicle is not stolen and provides a status signal to processor 26 indicating that the vehicle is not stolen.

It is to be appreciated that practically, the level and phase of the difference signal tend to zero since both antennas 18 and 20 of FIG. 1A receive substantially the same signals. The threshold values are employed to take into account acceptable deviations from zero due to the above mentioned factors of electromagnetic noise and separation of the antennas.

Preferably, the threshold values may be either determined by micro-controller 84, or stored in memory 86 at the time that theft prevention system 10 of FIGS. 1A and 1B is installed in the vehicle. Alternatively, the threshold values may be determined at time of manufacture, or at any other suitable time, and fed to memory 86.

If a thief steals the vehicle and breaks one of antennas 18 and 20, typically visible antenna 18, then antenna 18 is disconnected and signals are no longer provided by antenna 18 to antenna control circuitry 24. Accordingly, antenna control circuitry 24 senses a zero signal at the input of antenna 18. However, antenna 20, which is not broken, continues to receive signals, and to provide the signals to antenna control circuitry 24.

In such a case, the level of the difference signal, or the phase of the difference signal, or both, exceed one of the above mentioned threshold values, or both, and micro-controller 84 determines that an antenna is not active and provides a signal indicating theft of the vehicle to processor 26 of FIG. 1A.

In a preferred embodiment of the present invention micro-controller 84 may also command selector 82 to block passage of the signals from one of the antennas 18 and 20, or from both antennas 18 and 20, when the indication of the theft of the vehicle is generated.

When the signal indicating the theft of the vehicle is received at processor 26, processor 26 may perform the same operations as mentioned above with reference to FIG. 2, i.e. generate the waring messages, take pictures of the thief, store the warning messages and transmit information about the theft of the vehicle to central control station 12 of FIG. 1A, and turn off the engine after a given delay period.

Figure 5A:
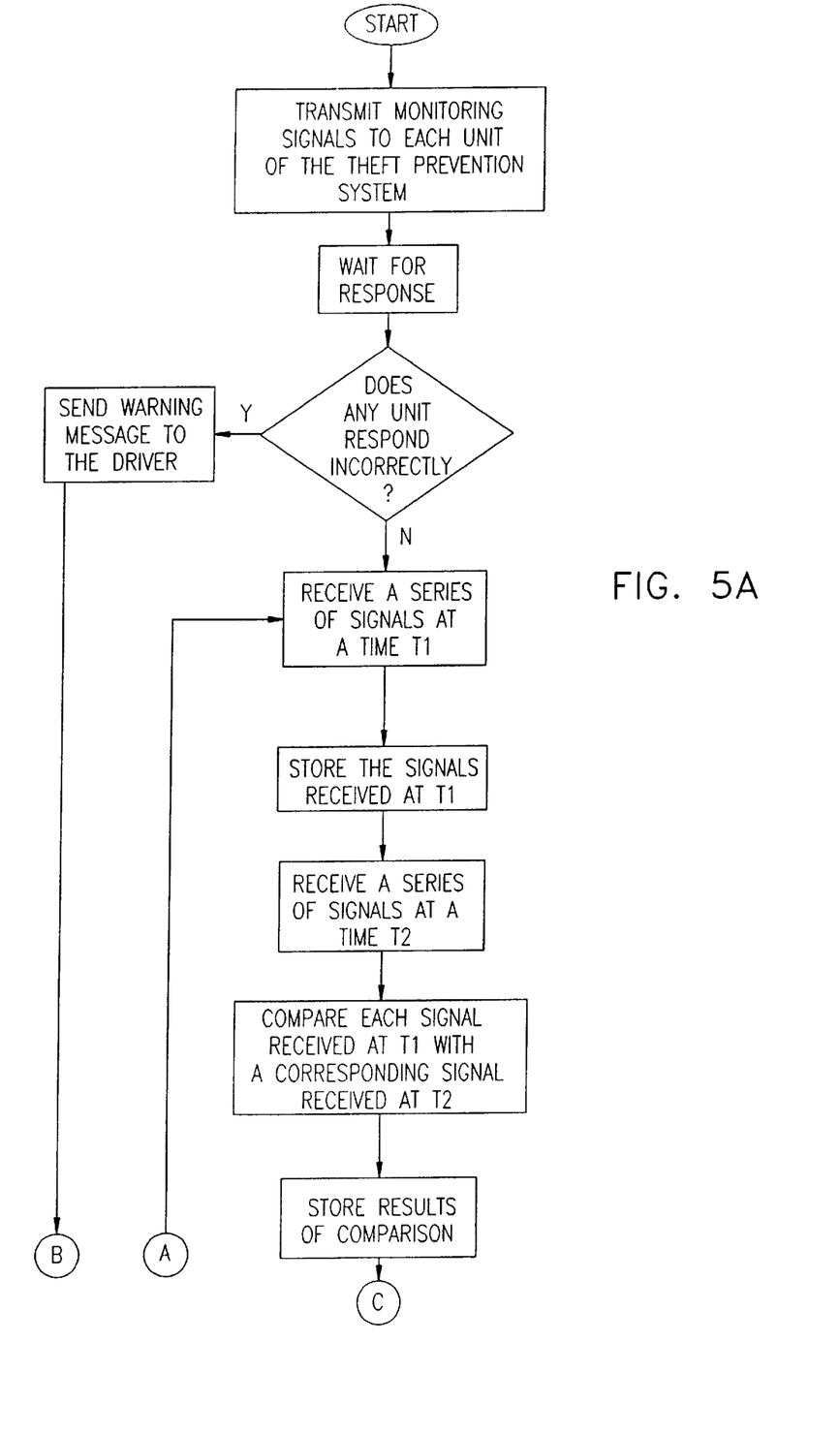
FIGS. 5A and 5B together constitute a flow chart illustrating a preferred method of operation of the theft prevention system of FIGS. 1A and 1B in accordance with another preferred embodiment of the present invention.
Figure 5B:
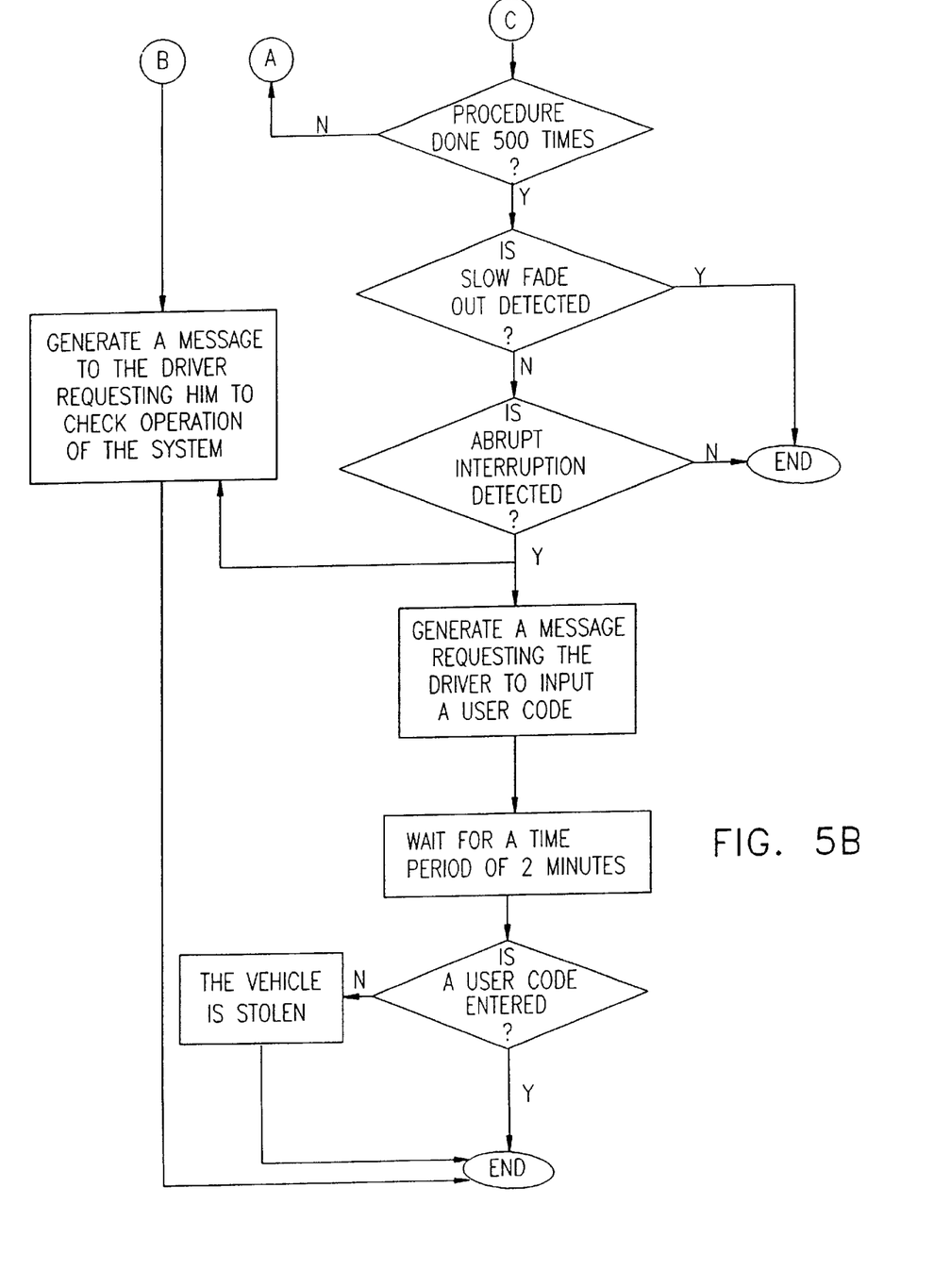

Reference is now made to FIGS. 5A and 5B which together constitute a flow chart illustrating a preferred method of operation of the theft prevention system of FIGS. 1A and 1B in accordance with another preferred embodiment of the present invention.

It is to be appreciated that one of the problems which typically face remote access systems, such as the vehicle theft prevention system of the present invention, is the ability to distinguish between malfunction of a component, such as an antenna or an internal unit of the theft prevention system, and theft of the vehicle. This may be solved by employing monitoring circuitry 54 of FIG. 1A which continuously monitors the status of the internal units of vehicle theft prevention system 10 of FIGS. 1A and 1B.

In a preferred embodiment of the present invention monitoring circuitry 54 transmits monitoring signals to each of the units of theft prevention system 10, via processor 26, and waits for a response signal from each of these units. If a unit does not respond, or responds with an incorrect signal, monitoring circuitry 54 determines that the unit is malfunctioning, and sends, via processor 26, a warning message to the driver. The warning message is preferably displayed on display 34 of FIGS. 1A and 1B.

It is to be appreciated that if the unit that caused generation of a warning message is a unit which participates in the reception and processing of incoming signals, such as receiving unit 22, antenna control circuitry 24 and processor 26, and reception at an antenna is interrupted after such a message is generated, vehicle theft prevention system 10 preferably does not determine that the vehicle is stolen.

Another problem which often occurs, is that an antenna does not receive signals due to interference in communication and/or interruption of the communication. Such interference or interruption may occur when the vehicle enters into areas in which communication may be blocked, such as an underground parking lot or at locations in which heavy electro-magnetic interference exists, such as near electric power stations.

In such a case, processor 26 of FIG. 1A may be employed to distinguish between lack of reception at an antenna due to interference and lack of reception at an antenna due to breakage of an antenna by a thief.

In a preferred embodiment of the present invention processor 26 compares signals received at vehicle theft prevention system 10 at a first time T1 with signals received at a second time T2.

Preferably, such comparison is performed sequentially, and for many values of T1 and T2, such as for several hundred sampling values. It is to be appreciated that the comparison is performed at each of antennas 18 and 20. Preferably, the difference between T2 and T1 is a short time period of the order of a few milliseconds, such as 2 milliseconds.

Typically, when the vehicle enters an area in which there is bad reception of signals, the communication between the vehicle and central control station 12 fades out slowly, until substantially no signals are received at vehicle theft prevention system 10. Thus, if the comparison performed by processor 26, at each of the antennas 18 and 20 of FIGS. 1A and 1B, results in a detection of a smooth and continuous fade out in the reception of the signals received at T2 with respect to the signals received at T1, processor 26 determines that the communication is interfered with.

If however, the comparison performed by processor 26 at any one of the antennas 18 and 20 results in a detection of an abrupt interruption of reception at T2 with respect to the signals received at T1, processor 26 determines that the antenna at which the abrupt interruption occurred is broken and that the vehicle is stolen. Generally, the abrupt interruption of reception results in a signal of substantially zero level at T2.

It is to be appreciated that if the difference between T2 and T1 is of the order of a few milliseconds, and the signals are sampled a few hundred times, determination of a fade out may be performed in times of the order of one second, which is practically acceptable in a situation in which the vehicle enters into an area in which communication may be interfered with or blocked, such as when the vehicle enters in an underground parking lot.

Alternatively, any suitable number of acceptable samples may be entered by an installer of vehicle theft prevention system 10 or pre-progranrmed and stored in memory 32 of FIG. 1A in accordance with parking conditions and road conditions. It is to be appreciated that the order of difference between T2 and T1 may be also pre-programmed by the installer and stored in memory 32 of FIG. 1A.

In another preferred embodiment of the present invention distinction between a state of no reception at an antenna due to interference and a state of no reception at an antenna due to breakage of an antenna by a thief may be performed by employing a user code.

In such a case, when no reception of signals is detected at an antenna, processor 26 may generate a message requesting the driver to enter a user code via keyboard 52 of FIGS. 1A and 1B. Preferably, the message is displayed on display 34 and played by speaker 44 via speaker interface 36. If the driver does not insert the user code after a pre-selected time period, such as 2 minutes, processor 26 determines that the driver is a thief and that the vehicle is stolen.

The user code may be also employed at a first use of the vehicle, after a period in which the vehicle is parked. In such a case, the user is instructed to enter a user code a pre-selected time period after ignition. The pre-selected time period may be of the order of 2 minutes, and if the user does not enter the user code, an alarm is generated. It is to be appreciated that the user may employ a smart card, such as smart card 46 of FIG. 1A, instead of entering a user code.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined by the claims which follow:

We claim:

1. For use in a vehicle, a vehicle theft prevention system which is operative to communicate with a central control station that transmits control signals to the vehicle, the system comprising:

an antenna;

a receiving unit coupled to said antenna and operative to receive, via said antenna, the control signals transmitted by the central control station; and a processor which is operative to apply interference to operation of at least one critical engine component in the vehicle after an interruption in reception of said control signals at said receiving unit.

2. A system according to claim 1 and wherein said interference is applied a pre-determined time period after said interruption in reception of said control signals at said receiving unit.

3. A system according to claim 1 wherein said interference includes interruption of operation of said at least one critical engine component.

4. A system according to claim 1 and wherein said pre-determined time period is of the order of a few minutes.

5. A system according to claim 1 and wherein said control signals comprise digital signals comprising periodic control word packets.

6. A system according to claim 5 and wherein said digital signals comprise compressed digital signals.

7. A system according to claim 5 and wherein said control word packets comprise personalized control word packets.

8. A system according to claim 6 and comprising a compressor/decompressor which is operative to decompress said compressed digital signals.

9. A system according to claim 1 and wherein said control signals are encrypted, and the system comprises an encryptor/decrypter which is operative to decrypt said encrypted control signals.

10. A system according to claim 1 and comprising:

a speaker interface which is coupled to said processor and is operative to receive from the processor instructions for playing at least one of voice messages and alarm signals; and a speaker which is coupled to said speaker interface and is operative to play said at least one of voice messages and alarm signals.

11. A system according to claim 1 and comprising an engine interface which is coupled to said processor and to said at least one critical engine component, wherein said engine interface is operative to interfere with the operation of said at least one critical engine component in response to an instruction provided by said processor.

12. A system according to claim 1 and comprising a display for displaying visual messages in response to an instruction provided by said processor.

13. A system according to claim 1 and comprising:

a video camera interface which is coupled to said processor and is operative to receive from the processor instructions for photographing; and a video camera which is coupled to said video camera interface and is operative to photograph a driver in said vehicle.

14. A system according to claim 13 and comprising a vehicle transmitting unit which is coupled to said video camera and to said processor and is operative to transmit at least video pictures of the driver and said voice messages to said central control station via said antenna.

15. A system according to claim 14 and wherein said vehicle transmitting unit is also coupled to said compressor/decompressor for compressing information which is to be transmitted to said central control station prior to transmission thereto.

16. A system according to claim 14 and wherein said vehicle transmitting unit is also coupled to said encryptor/decrypter for encrypting information which is to be transmitted to said central control station prior to transmission thereto.

17. A system according to claim 1 and comprising a memory which is coupled to said processor and is operative to store any of warning messages and pictures of a driver.

18. A system according to claim 17 and wherein said memory is operative to store at least one of the following: any information that is played to a driver and any information that is displayed to a driver.

19. A system according to claim 17 and wherein said memory is operative to store at least one of a time when video pictures are photographed, a time of theft of the vehicle, a location of the vehicle, and a velocity of the vehicle.

20. A system according to claim 1 and comprising:
  antenna control circuitry operative to control said antenna;
  a card reader which is coupled to said processor and is operative to communicate with a smart card, said smart card being operative to control access to the vehicle; and
  monitoring circuitry which is operative to monitor the status of at least one of said receiving unit, said antenna control circuitry, said processor and said card reader.

21. A system according to claim 1 and comprising a keyboard for entering at least one of user data and installer data.

22. A system according to claim 21 and wherein said user data includes at least one of a user code and a delay period after which said interference to operation of at least one critical engine component is applied.

23. A system according to claim 21 and wherein said installer data includes a delay period, after which said interference to operation of at least one critical engine component is applied.

24. A system according to claim 1 and comprising a card reader which is coupled to said processor and is operative to communicate with a smart card, wherein said smart card is operative to control access to the vehicle.

25. For use in a vehicle, a vehicle theft prevention system which is operative to communicate with a central control station which transmits control signals to the vehicle, the system comprising:
  a first antenna and a second antenna, each operative to receive the control signals transmitted by the central control station;
  antenna control circuitry which is operative to compare signals received at the first antenna with signals received at the second antenna and to provide a determination of an interruption of reception of said control signals at at least one of said first antenna and said second antenna; and
  a processor coupled to said antenna control circuitry and operative to determine a theft of the vehicle in accordance with said determination of said interruption of reception of said control signals at said at least one of said first antenna and said second antenna.

26. A system according to claim 25 and wherein said antenna control circuitry comprises:
  a comparator which is operative to compare signals received at said first antenna with signals received at said second antenna and to generate a comparison signal;
  a micro-controller which is coupled to said comparator and is operative to receive said comparison signal and to generate an instruction in response to said comparison signal; and
  a selector which is coupled to said micro-controller and to said comparator and is operative to select one of signals received at said first antenna and signals received at said second antenna in response to the instruction provided by said micro-controller.

27. A system according to claim 26 and wherein said antenna control circuitry also comprises a memory which is coupled to said micro-controller and is operative to store threshold values which are employed by said micro-controller to determine quality of operation of said first antenna and of said second antenna.

28. A method of preventing a theft of a vehicle, the method being employed with a vehicle mounted system which is operative to communicate with a central control station which transmits control signals to the vehicle, the method comprising:
  receiving said control signals via an antenna; and
  applying interference to operation of at least one critical engine component in the vehicle when said receiving of said control signals is interrupted.

29. A method according to claim 28 and wherein said applying step includes activating said interference to operation of at least one critical engine component in the vehicle a pre-determined time period after said receiving of said control signals is interrupted.

30. A method according to claim 28 wherein said interference includes interruption of the operation of said at least one critical engine component.

31. A method according to claim 28 and comprising:
  determining that the vehicle is stolen by a thief; and
  providing a warning message to inform the thief that the engine will be turned off after a delay period.

32. A method according to claim 31 and wherein said delay period is of the order of a few minutes.

33. A method according to claim 31 and wherein said step of providing a warning message comprises generating at least one of a voice message, a visual warning message and an alarm signal.

34. A method according to claim 31 and comprising photographing a driver in response to said determining step.

35. A method according to claim 31 and comprising storing at least one of information that is provided to the thief and pictures of the thief.

36. A method according to claim 31 and comprising transmitting information indicating a theft of the vehicle to said central control station in response to said determining step.

37. A method according to claim 36 and wherein said transmitting also includes transmitting information including at least one of a time of the theft of the vehicle, a time at which the pictures of the thief have been taken, a location of the vehicle, and a velocity of the vehicle.

38. A method according to claim 36 and comprising compressing said information prior to said transmitting.

39. A method according to claim 36 and comprising encrypting said information prior to said transmitting.

40. A method according to claim 31 and wherein said step of determining that the vehicle is stolen by a thief comprises determining that a valid smart card is not inserted in a smart card reader within a pre-determined time period after ignition of the vehicle.

41. A method according to claim 31 and wherein said step of determining that the vehicle is stolen by a thief comprises:
  generating a message requesting a driver to enter a user code; and
  determining that the driver does not insert the user code during a pre-determined time period.

42. A method according to claim 28 and also comprising transmitting a vehicle theft signal from the theft prevention system, the vehicle theft signal comprising an identification of the vehicle.

43. A method according to claim 42 wherein said control signals comprise digital signals comprising periodic control word packets.

44. A method according to claim 43 wherein said control word packets comprise personalized control word packets.

45. A method according to claim 43 wherein the control word packets comprise personalization information and the identification of the vehicle comprises the personalization information.

46. A method for preventing theft of a vehicle, the method being employed with a vehicle mounted system which is operative to communicate with a central control station which transmits control signals to the vehicle, the method comprising:
  providing a first antenna and a second antenna, wherein each of said first antenna and said second antenna is operative to receive the control signals transmitted by the central control station;
  comparing signals received at the first antenna with signals received at the second antenna to provide a difference signal indiicating at least one of a difference in signal level and a difference in signal phase between said signals received at the first antenna and said signals received at the second antenna;
  determining an interruption of reception of said control signals at at least one of said first antenna and said second antenna; and
  generating an indication of a theft of the vehicle in response to said determining step.

47. A method according to claim 46 and comprising:
  selecting one of the signals received at said first antenna and the signals received at said second antenna in response to an instruction provided by a microcontroller; and
  providing the selected signals to a processor.

48. A method according to claim 46 and wherein said determining step includes:
  comparing a level of said difference signal with a level threshold value;
  comparing a phase of said difference signal with a phase threshold value; and
  determining an interruption of reception of said conltrol signals at at least one of said first antenna and said second antenna when at least one of the level of the difference signal and the phase of the difference signal exceeds said level threshold value and said phase threshold value respectively.

49. A method according to claim 48 and comprising storing the level threshold value and the phase threshold value in a memory.

50. A method of distinguishing between a vehicle theft and an interference in communication in a theft prevention system which is mounted in the vehicle and which communicates with a central control station that transmits control signals which are received at the theft prevention system, the method comprising:
  comparing signals received at the theft prevention system at a first time period with signals received at the theft prevention system at a second time period;
  determining an interference of communication upon detection of a continuous fade out in reception of the signals received at the second time period with respect to the signals received at the first time period; and
  determining a vehicle theft when the signals received at said second time period are substantially of zero level.

* * * * *